(12) United States Patent
Heitzler et al.

(10) Patent No.: US 8,769,966 B2
(45) Date of Patent: Jul. 8, 2014

(54) THERMAL GENERATOR USING MAGNETOCALORIC MATERIAL

(75) Inventors: Jean-Claude Heitzler, Horbourg-Wihr (FR); Christian Muller, Strasbourg (FR)

(73) Assignee: Cooltech Applications Societe par Actions Simplifiee, Holtzheim (FR)

(*) Notice: Subject to any disclaimer, the term of this patent is extended or adjusted under 35 U.S.C. 154(b) by 584 days.

(21) Appl. No.: 12/852,671

(22) Filed: Aug. 9, 2010

(65) Prior Publication Data

US 2012/0031107 A1 Feb. 9, 2012

(51) Int. Cl.
*F25B 21/00* (2006.01)
*F25B 21/02* (2006.01)

(52) U.S. Cl.
CPC ............... *F25B 21/00* (2013.01); *Y02B 30/66* (2013.01); *F25B 2321/002* (2013.01)
USPC .......................................................... 62/3.1

(58) Field of Classification Search
USPC .............................................. 62/3.1, 3.7, 447
See application file for complete search history.

(56) References Cited

U.S. PATENT DOCUMENTS

| | | | | |
|---|---|---|---|---|
| 2,648,784 A | * | 8/1953 | Chilowsky | 310/306 |
| 3,765,186 A | * | 10/1973 | Vassilev | 62/3.1 |
| 4,332,135 A | * | 6/1982 | Barclay et al. | 62/3.1 |
| 4,727,721 A | * | 3/1988 | Peschka et al. | 62/3.1 |
| 4,916,907 A | * | 4/1990 | Munk et al. | 62/3.1 |
| 4,947,648 A | * | 8/1990 | Harwell et al. | 62/3.2 |
| 5,156,003 A | * | 10/1992 | Yoshiro et al. | 62/3.1 |
| 5,182,914 A | * | 2/1993 | Barclay et al. | 62/3.1 |
| 5,231,834 A | * | 8/1993 | Burnett | 62/3.1 |
| 5,249,424 A | * | 10/1993 | DeGregoria et al. | 62/3.1 |
| 6,668,560 B2 | * | 12/2003 | Zimm et al. | 62/3.1 |
| 6,826,915 B2 | * | 12/2004 | Wada et al. | 62/3.1 |
| 6,935,121 B2 | * | 8/2005 | Fang et al. | 62/3.1 |
| 7,552,592 B2 | * | 6/2009 | Iwasaki et al. | 62/3.1 |
| 7,596,955 B2 | * | 10/2009 | Muller et al. | 62/3.1 |
| 7,644,588 B2 | * | 1/2010 | Shin et al. | 62/3.1 |
| 7,687,958 B2 | * | 3/2010 | Maki-Ontto et al. | 310/156.53 |
| 7,897,898 B2 | * | 3/2011 | Muller et al. | 219/672 |
| 2007/0199332 A1 | * | 8/2007 | Muller et al. | 62/3.1 |
| 2012/0060512 A1 | * | 3/2012 | Vetrovec | 62/3.1 |
| 2012/0060513 A1 | * | 3/2012 | Vetrovec | 62/3.1 |
| 2012/0272666 A1 | * | 11/2012 | Watanabe et al. | 62/3.1 |
| 2012/0291453 A1 | * | 11/2012 | Watanabe et al. | 62/3.1 |

* cited by examiner

*Primary Examiner* — Ljiljana Ciric
*Assistant Examiner* — Alexis Cox
(74) *Attorney, Agent, or Firm* — Davis & Bujold, PLLC; Michael J. Bujold

(57) ABSTRACT

A thermal generator (100) with at least one thermal module (110) comprising at least two magnetocaloric elements (111, 112). The thermal generator is characterized in that it comprises at least two magnetic assemblies (131, 132) in which one magnetic assembly (131, 132) subjects at least one magnetocaloric element (111, 112) of the thermal module (110) to alternate magnetic phases. The thermal generator is further characterized in that it comprises a thermally insulating body insulating the magnetic assemblies (131, 132) from each other and forming thermally insulated cells (141, 142) comprising one magnetic assembly (131, 132) and its corresponding magnetocaloric elements (111, 112).

15 Claims, 8 Drawing Sheets

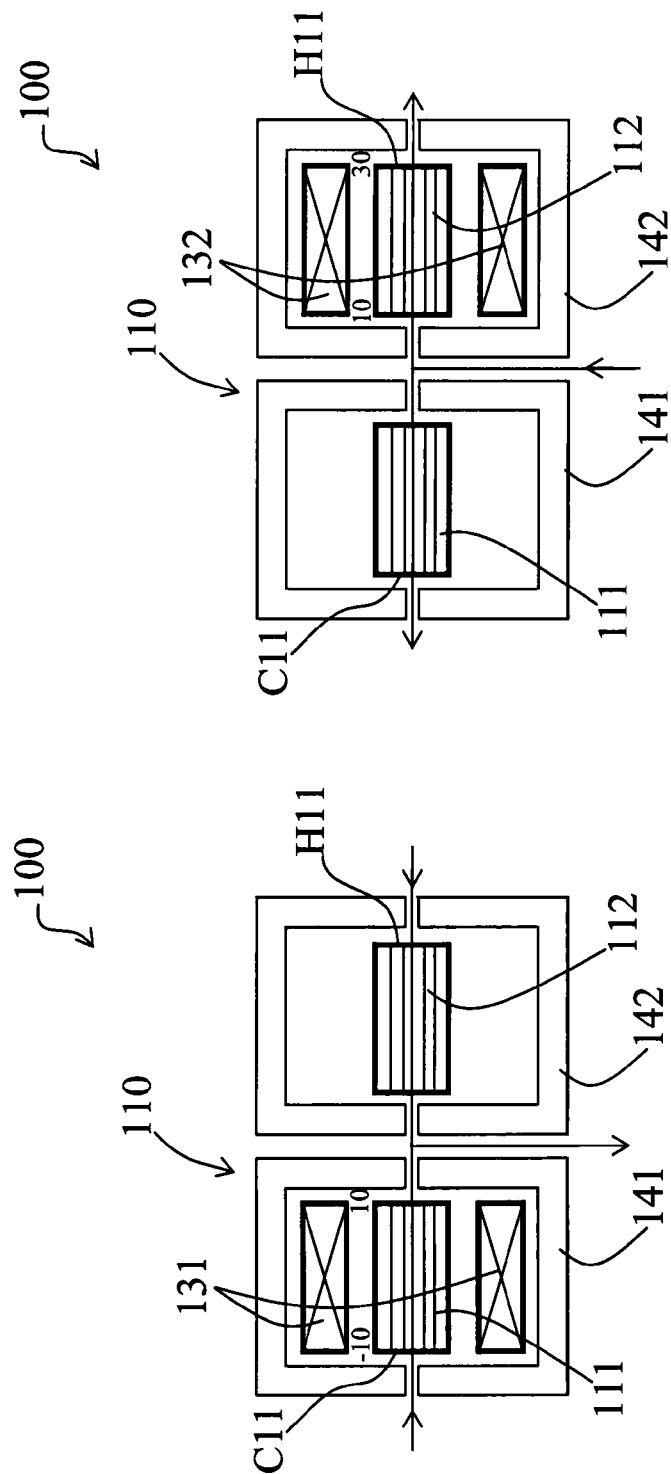

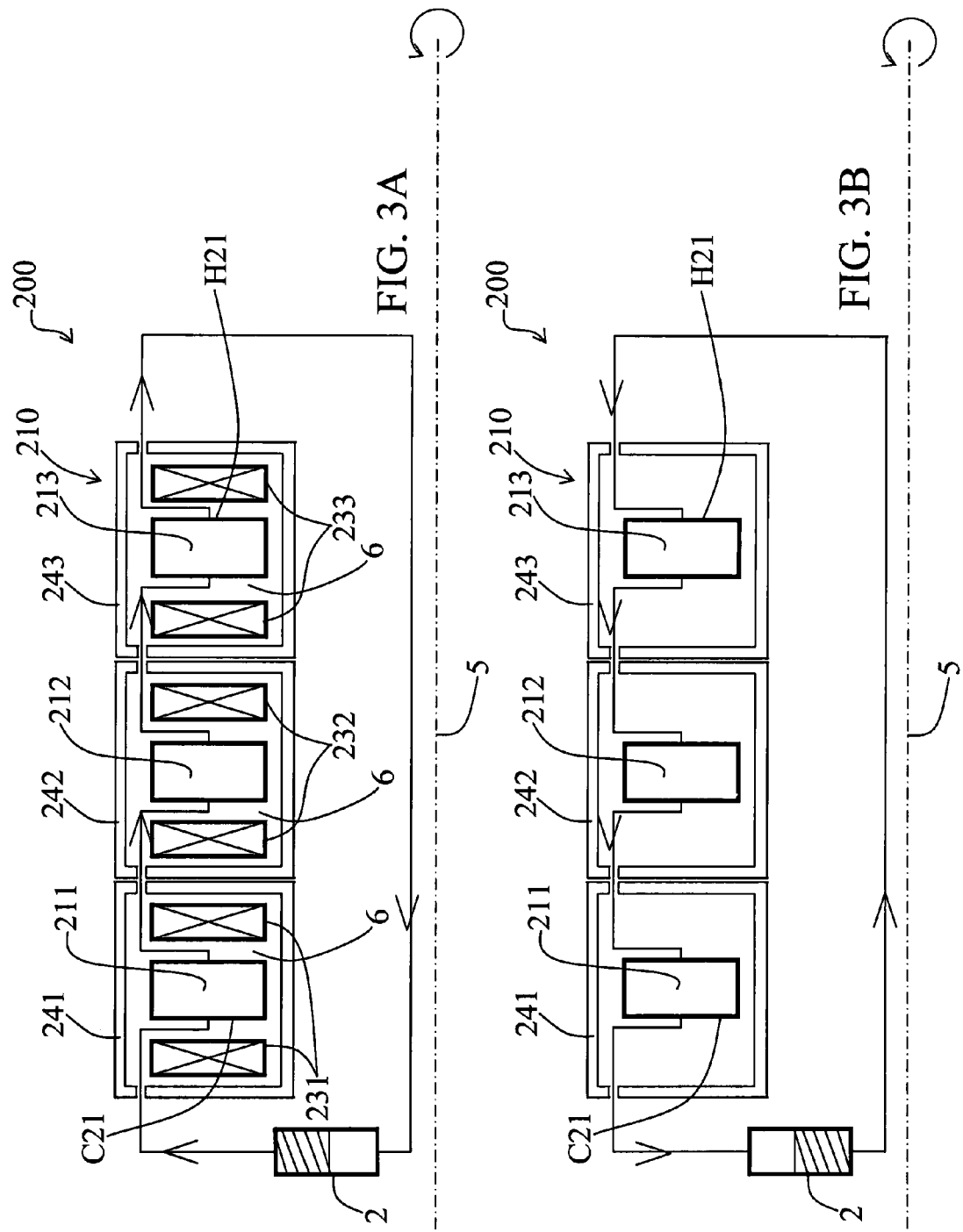

THERMAL GENERATOR USING MAGNETOCALORIC MATERIAL

TECHNICAL FIELD

The present invention concerns a thermal generator with at least one thermal module comprising at least two magnetocaloric elements.

BACKGROUND OF THE INVENTION

The technology of magnetic refrigeration at room temperature is known for more than twenty years and we know its advantages in terms of ecology and sustainable development. We also know its limitations in effective heat capacity and thermal efficiency. Therefore, research in this field tends to improve the performance of such a generator by acting on various parameters like the strength of the magnetic field, the performances of the magnetocaloric materials, the heat exchange surface between the heat transfer fluid and the magnetocaloric materials, the performance of the heat exchangers, etc.

The choice of the magnetocaloric materials is a determining factor and has a direct impact on the performances of a magnetocaloric thermal generator. The magnetocaloric effect reaches a peak around the Curie temperature of magnetocaloric materials. It is known to associate many magnetocaloric materials with different Curie temperatures in order to operate a magnetocaloric thermal generator over a wide range of temperatures.

Thus, many magnetocaloric thermal generators use the magnetocaloric effect of several magnetocaloric materials by circulating a heat transfer fluid along or through said magnetocaloric materials, in two opposite directions according to phases of increase or decrease of the magnetic field to which the magnetocaloric materials are subjected. At the start up of such a thermal generator, the circulation of the fluid allows to obtain a temperature gradient between both ends of the magnetocaloric material. The achieving of this temperature gradient depends on several factors like the initial temperature, the flow rate of the heat transfer fluid, the intensity of the magnetocaloric effect, the Curie temperature and the length of the magnetocaloric materials. The more the initial temperature and the Curie temperature of the magnetocaloric materials are close, the more a temperature gradient, with which the generator is functional and can produce or exchange thermal energy with an external circuit, will be rapidly reached. Now, the initial temperature of the heat transfer fluid and of the magnetocaloric materials is not controlled and is equal to the outside temperature of the generator. This temperature can be comprised in a very wide range of temperatures, for example between −20 and +60° C. This implies that to achieve the temperature gradient, i.e. the operational phase of a thermal magnetocaloric generator, it can take a long time.

Moreover, the operation over a wide range of temperatures implies that the magnetic system which is generally constituted by an assembly of permanent magnets is subjected to an important temperature variation. Indeed, the magnetocaloric materials are generally disposed in the magnetic gap of the magnet assembly and lead a temperature change of the magnetic system through thermal convection. For that purpose, FIGS. 1A and 1B illustrate a thermal generator comprising a magnetic system with two magnets M1 and M2 creating a gap G in which two magnetocaloric materials MC1 and MC2 move. Almost the whole volume of the gap is alternately filled with one magnetocaloric material MC1 or MC2. When one of said magnetocaloric materials MC1 and MC2 is in the gap, there is a minimal space between the magnets M1, M2 and this magnetocaloric material MC1, MC2, in order to increase the magnetic effect and thus the thermal power. The first magnetocaloric material MC1 has a Curie temperature of 0° C. and an operating or transition area comprised between −10° C. and +10° C. and the second magnetocaloric material MC2 has a Curie temperature of 20° C. and an operating or transition area comprised between +10° C. and +30° C. FIG. 1A shows a first phase of the cycle in which the first magnetocaloric material MC1 is subjected to an increasing magnetic field and the second magnetocaloric material MC2 is subjected to a decreasing magnetic field and FIG. 1B shows the second phase of the cycle in which the first magnetocaloric material MC1 is subjected to a decreasing magnetic field and the second magnetocaloric material MC2 is subjected to an increasing magnetic field. The thermal amplitude undergone by the magnets is about 40° C. (from −10° C. to +30° C.). The magnets, with their thermal inertia, have a negative impact on the temperature gradient in the magnetocaloric materials MC1 and MC2: they thermally exchange with said magnetocaloric materials MC1 and MC2, which reduces the temperature gradient of the magnetocaloric materials. The result is that the performance of such a thermal generator, which is bound to this temperature gradient, is reduced.

SUMMARY OF THE INVENTION

The present invention aims to overcome the aforementioned drawbacks by proposing a thermal generator having an improved thermal efficiency.

For this purpose, the thermal generator according to the invention is characterized in that it comprises at least two magnetic assemblies in which one magnetic assembly subjects at least one magnetocaloric element of said thermal module to alternate magnetic phases, and in that it comprises a thermally insulating body insulating the magnetic assemblies from each other and forming thermally insulated cells comprising one magnetic assembly and its corresponding magnetocaloric elements.

Preferably, said at least two magnetocaloric elements can have different Curie temperatures and can be fluidly connected together at their ends or end parts according to their increasing Curie temperature. Said thermal module can have a temperature gradient corresponding to the temperature difference between a cold end or cold end part of the magnetocaloric element with the lowest Curie temperature and a hot end or hot end part of the magnetocaloric element with the highest Curie temperature. Said at least two magnetocaloric elements can preferably cover the temperature gradient of the thermal module so that the ends or end parts of two magnetocaloric elements fluidly connected together have a close temperature, and said at least two magnetocaloric elements can also each alternately be subjected to an increasing and decreasing magnetic field while being into contact with a heat transfer fluid whose flow direction changes from one end or end part of said magnetocaloric elements to the other end or end part at each change of magnetic phase.

The magnetocaloric elements are intended to be in thermal contact with the heat transfer fluid circulating from their cold end to their hot end during a first phase of the magnetic cycle which corresponds to the phase where the magnetocaloric materials or elements are subjected to an increase of temperature (for the magnetocaloric elements described, the phase of increase of the magnetic field) and from the hot end to the cold end during the second phase of the magnetic cycle where the magnetocaloric materials or elements are subjected to a decrease of temperature (for these magnetocaloric elements, the phase of decrease of the magnetic field). For materials with inverse magnetocaloric effect, an increase of the magnetic field leads to a decrease of the temperature of said materials and a decrease of the magnetic field leads to an increase of the temperature of said materials. The thermal contact between the heat transfer fluid and the magnetocaloric elements can be realized by a heat transfer fluid passing along or through the magnetocaloric materials. For this purpose, magnetocaloric elements can be constituted by one or more magnetocaloric materials and can be permeable to the heat transfer fluid. They can comprise fluid conducting passages extending between both ends of the magnetocaloric materials. These passages can be realized by the porosity of the magnetocaloric materials, or by channels machined or obtained by the assembly of plates of magnetocaloric materials.

Preferably, the heat transfer fluid is a liquid. For that purpose, it is possible to use pure water or water added with an antifreeze, a glycol product or a brine.

Furthermore, and according to the invention, ends of the magnetocaloric elements that are fluidly connected have a close temperature, i.e. the temperature difference between both connected ends is low, and these ends have preferably the same temperature.

A magnetic phase corresponds to an increase or a decrease of the magnet field. Thus a magnetic cycle undergone by a magnetocaloric element corresponds to an increase and a decrease of the magnetic field in said magnetocaloric element and that leads to a corresponding increase and decrease (or reverse) of its temperature.

The magnetic assemblies can comprise a combination of permanent magnets as it is illustrated or electromagnets. When using permanent magnets, the change of magnetic phase can be realized, for example, by a relative motion between the magnetic assemblies and the corresponding magnetocaloric elements. Of course, other possibilities that permit to vary the magnetic field are not excluded from this invention.

According to the invention, for said thermal module, one magnetic assembly can be assigned to one magnetocaloric element.

The thermal generator can also comprise at least two thermal modules and at least one common magnetic assembly can subject magnetocaloric elements of at least two thermal modules to alternated magnetic phases.

The insulating body can be realized by a layer of at least one thermal insulating material disposed around each magnetic assembly and its corresponding magnetocaloric elements.

The insulating body can also be fixed to the magnetic assemblies.

According to the invention, said thermally insulated cells can be tight enclosures.

Therefore, said thermally insulated cells can be under vacuum.

Said insulated cells can also be filled with a gas or with a mix of different gases of low thermal conductivity. This gas can be argon or krypton, for example.

In one embodiment, said gas contained in said insulated cells can be at atmospheric pressure.

In another embodiment, said gas contained in said insulated cells can be pressurized.

Furthermore, a layer of thermal insulating material can be disposed between each magnetic assembly and its corresponding magnetocaloric elements.

BRIEF DESCRIPTION OF DRAWINGS

The present invention and its advantages will be more apparent from the following description of embodiments given as non-limiting examples and referring to the attached drawings, in which:

FIGS. 2A and 2B are schematic views of one thermal module comprising two magnetocaloric elements of a generator according to one embodiment of the invention, respectively in two successive magnetic phases, FIGS. 3A and 3B are schematic views of a thermal module of a generator according to a second embodiment of the invention, in two successive magnetic phases.

DETAILED DESCRIPTION OF THE INVENTION

Figure 1B:
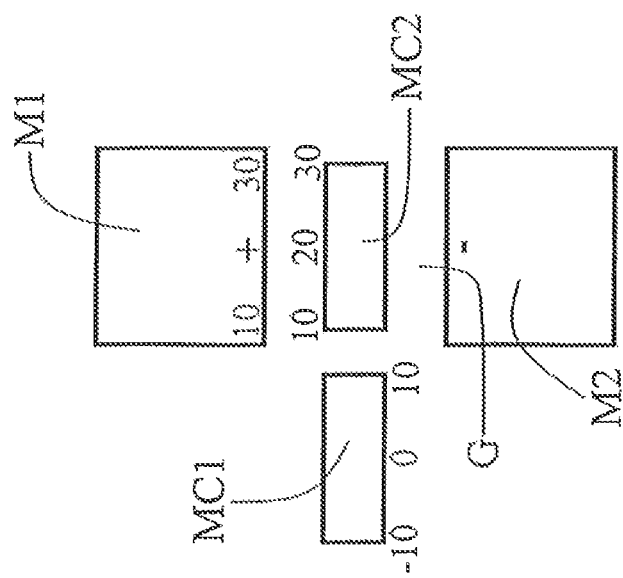
FIGS. 1A and 1B are schematic views of a thermal generator according to the prior art, respectively in two successive magnetic phases.

In the illustrated embodiments, identical parts carry the same numerical references.

FIGS. 2A and 2B show, in schematic view, a thermal module 110 of a thermal generator 100 according to a first embodiment of the present invention. This thermal module 110 comprises two magnetocaloric elements 111 and 112. The cold end C11 of the thermal module 110 is the end on the left side of FIGS. 2A and 2B of the first magnetocaloric element 111 and the hot end H11 of the thermal module 110 is the end on the right side of FIGS. 2A and 2B of the second magnetocaloric element 112. Each magnetocaloric element 111 and 112 is subjected to a magnetic cycle realized by one corresponding magnetic assembly 131, 132. During a first alternation (see FIG. 2A), the heat transfer fluid F flows from the cold end C11 of the magnetocaloric element 111 subjected to an increase of the magnetic field to the other end of this magnetocaloric element 111 (its hot end) and from the hot end H11 of the magnetocaloric element 112 subjected to a decrease of the magnetic field to the other end of this magnetocaloric element 112 (its cold end) and in the second alternation, the flow direction is reversed.

Each magnetic assembly 131, 132 is constituted by two permanent magnets facing each others. This permits to realize a thermal insulation between both magnetic assemblies 131, 132 with their corresponding magnetocaloric materials 111 and 112 by creating insulated cells 141 and 142. The thermal insulation is realized by a layer of high insulating material disposed around the magnetic assemblies 131, 132. In this example, the moving of the magnetic assemblies leads to a change of the magnetic field.

Figure 1A:
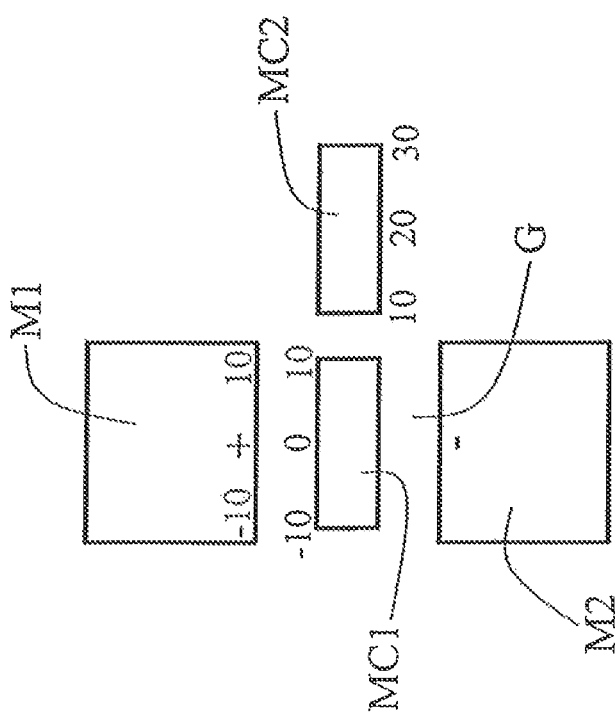

The magnetocaloric elements 111 and 112 have the same characteristics as the magnetocaloric elements MC1 and MC2 described in relation with the prior art generator shown in FIGS. 1A and 1B. However, the thermal generator 100 of the invention has an increased level of efficiency since the thermal impact of the inactive mass of the magnets 131, 132 is reduced due to the presence of two thermal insulated cells 141 and 142. Thus, in cells 141 and 142, the temperature gradient undergone by the magnetic assemblies 131 and 132 amounts twenty degrees (respectively between −10° C. and +10° C. and between +10° C. and +30° C.) while it was about forty degrees in the prior art generator. Thus, the difference of temperature between the magnetocaloric materials 111 and 112 and their corresponding magnetic assemblies 131, 132 is also reduced, so that the efficiency of the thermal generator is increased.

Figure 4A:
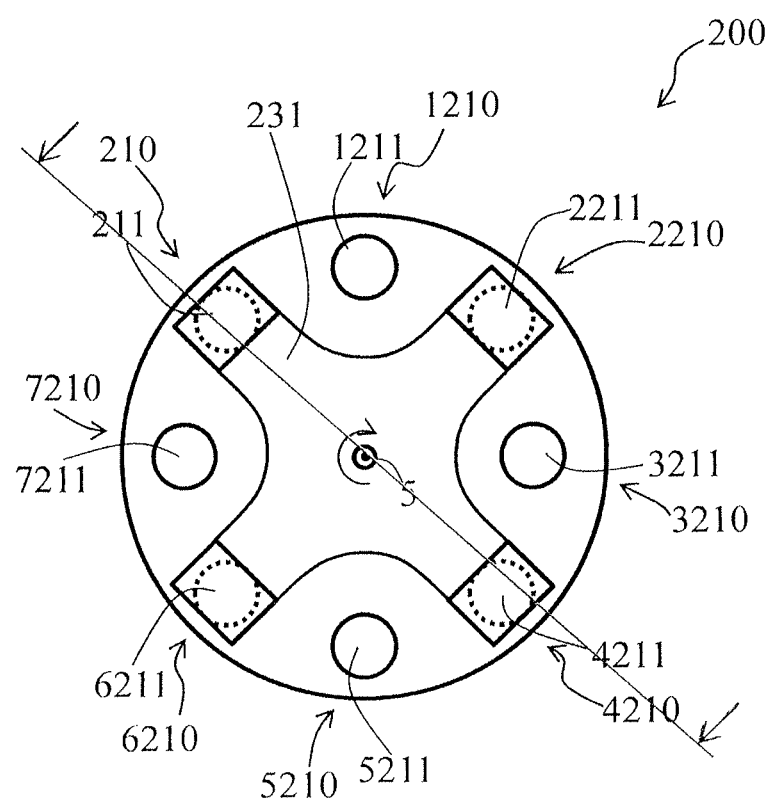
FIGS. 4A and 4B are schematic front views of the generator of FIGS. 3A and 3B.
Figure 4B:
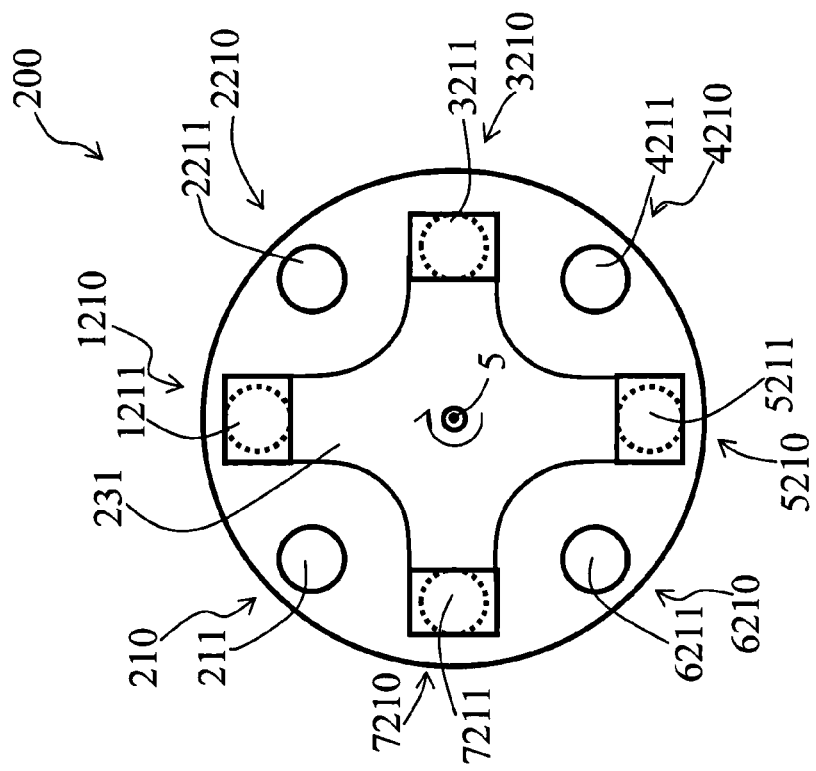
Figure 4C:
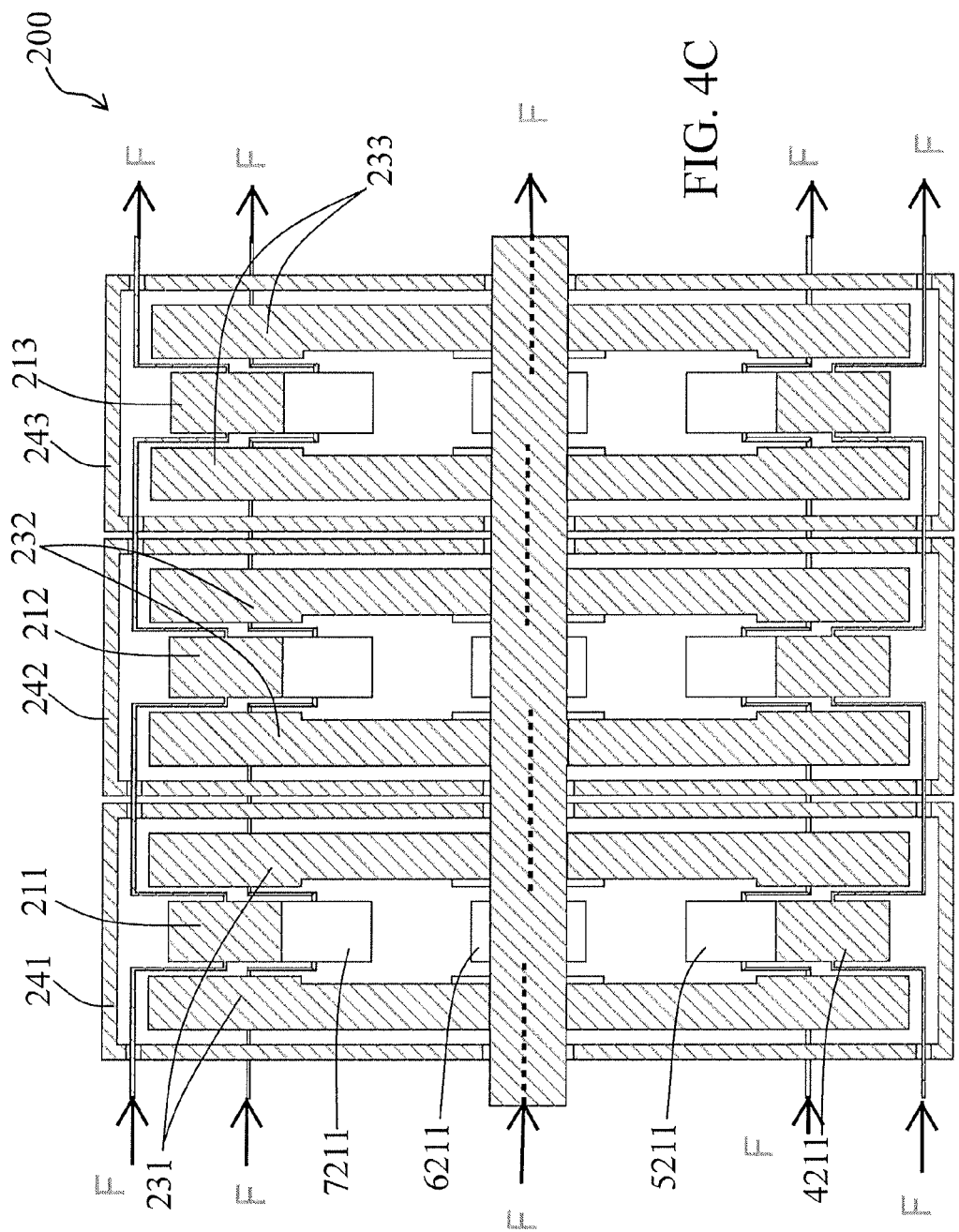
FIG. 4C is a diagrammatic cross-sectional view of the generator of FIG. 4A
Figure 4D:
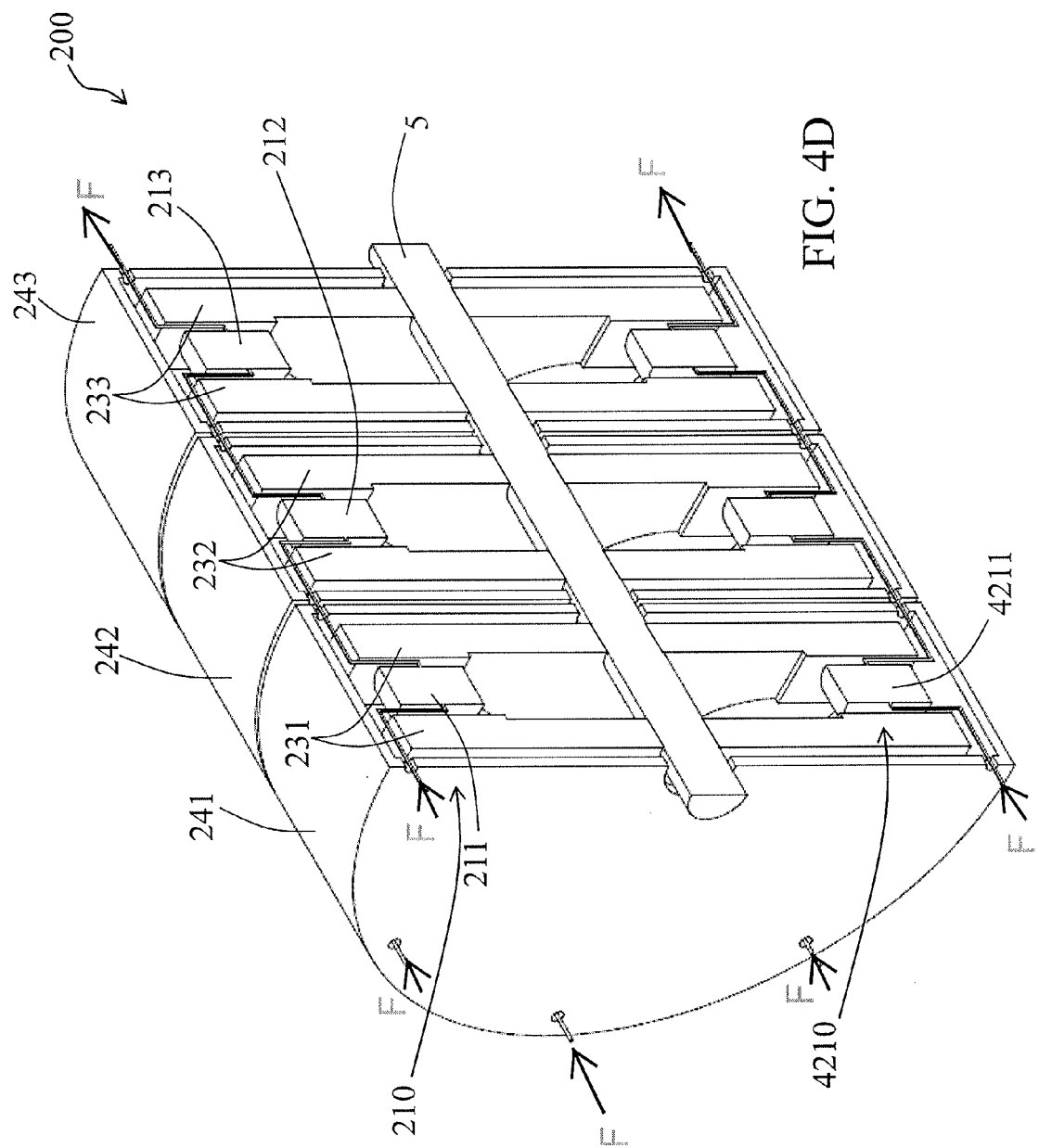
FIG. 4D is a diagrammatic perspective view of FIG. 4C and FIGS. 5A and 5B are schematic views of two thermal modules of a generator according to a third embodiment of the invention, in two successive magnetic phases.

FIGS. 3A and 3B show, in schematic view, a thermal module 210 of a thermal generator 200 according to a second embodiment of the present invention. This example is particularly adapted for rotational thermal generators 200 where the magnetic assemblies 231, 232, 233 are fixed to a shaft in rotation around the longitudinal axis 5 of the generator 200. FIGS. 4A and 4B represent a simplified front view of this thermal generator 200 showing more particularly one part of a magnetic assembly 231 in the positions corresponding respectively to these of FIGS. 3A and 3B.

FIGS. 4A, 4B, 4C and 4D show the interaction between the magnetic assemblies 231 and one magnetocaloric element 211, 1211, 2211, 3211, 4211, 5211, 6211 and 7211 of the eight thermal modules 210, 1210, 2210, 3210, 4210, 5210, 6210 and 7210 of this thermal generator 200. Each magnetic assembly 231, 232, 233 is constituted by two groups of four permanent magnets facing each other and forming a magnetic gap 6 in which the magnetocaloric materials of the corresponding thermal modules are positioned. These permanent magnets are evenly spaced out around the longitudinal axis 5 of the magnetocaloric thermal generator 200 so that they create four magnetic radial sectors spaced out by four non magnetic radial sectors (see in particular FIGS. 4A and 4B). Thus, the rotation of the shaft or axis 5 drives the magnetic assemblies 231, 232, 233 that subject the corresponding magnetocaloric elements to a variation of magnetic field and thus to an increase and decrease of their temperature according to the magnetic phase.

The thermal module 210 has three magnetocaloric elements 211, 212 and 213 connected by a heat transfer fluid flowing through said magnetocaloric elements 211, 212, 213. In this example, the magnetocaloric material 211 disposed at the left hand of the FIGS. 3A and 3B has the lowest Curie temperature and is able to create a temperature gradient from −10° C. to 0° C. between its cold and hot ends. It is in fluid contact with the magnetocaloric material 212 positioned in the middle of the thermal module 210 and able to create a temperature gradient from 0° C. to +10° C. between its cold and hot ends. At least, the third magnetocaloric material 213, which has the highest Curie temperature is connected with the second magnetocaloric material 212 and is able to achieve a temperature gradient from +10° C. to +20° C.

This embodiment comprises eight thermal modules 210, 1210, 2210, 3210, 4210, 5210, 6210 and 7210, the magnetocaloric materials being disposed radially around the shaft, such that when one magnetocaloric material is in the air gap of the magnetic assembly (i.e. between two permanent magnets), the two adjacent magnetocaloric materials are outside the air gap, and vice versa. Such a configuration permits to optimize the volume of the thermal generator 200 by exploiting continuously the magnetic field realized by the magnetic assemblies 231, 232, 233. For this purpose, FIGS. 3A, 3B and 4A, 4B show two successive magnetic phases undergone by the magnetocaloric materials.

In this second embodiment, the magnetic assemblies 231, 232, 233 are insulated by layers of high efficiency insulating foam placed onto these magnetic assemblies 231, 232, 233 (for the longitudinal insulation) and around the thermal generator 200 (for the radial insulation) so that twenty-four thermal insulating cells are created (only cells 241, 242 and 243 are shown). Under these conditions, in each isolated cell 241, 242, 243, the temperature difference between the magnetocaloric material 211, 212, 213 and the corresponding magnetic assembly 231, 232, 233 is low and has no influence on the temperature gradient of the magnetocaloric materials. In other words, the magnetic assemblies 231, 232, 233 of the corresponding magnetocaloric materials 211, 212, 213 are split and form individual insulated thermal cells 241, 242, 243 that can exchange thermally only with the heat thermal fluid circulating through them all. The thermal insulation is realized by a layer of thermal insulating material like high efficiency foam. This layer can also be applied on another component or armature inside the thermal generator 200 to create these insulated thermal cells.

Although this second embodiment describes a configuration with three magnetic assemblies and eight thermal modules, the invention is not restricted to this number of magnetic assemblies and of magnetocaloric materials. Other configurations are possible and can depend on the application to be connected to the magnetocaloric thermal generator, on the space available for the magnetocaloric thermal generator, etc.

The displacement of the heat transfer fluid in two opposite directions is achieved by a piston 2 associated to each thermal module 210, but another adapted device can also be used. This piston 2 moves the heat transfer fluid in the direction of the hot end H21 of the thermal module 210 during the warm-up of the corresponding magnetocaloric materials (FIG. 3A) and in the direction of the cold end C21 of the thermal module 210 during the cooling of the corresponding magnetocaloric materials (FIG. 3B).

Thus, in FIG. 3A, the thermal module 210 undergoes an increase of temperature because the magnetocaloric materials 211, 212, 213 are disposed in the magnetic gap 6 of the corresponding magnetic assemblies 231, 232, 233 and the heat transfer fluid is moved from the cold end C21 of the magnetocaloric material 211 with the lowest Curie temperature of the thermal module 210 to the hot end H21 of the magnetocaloric material 213 with the highest Curie temperature. In FIG. 3B, the thermal module 210 undergoes a decrease of temperature because the magnetocaloric materials 211, 212, 213 are outside the magnetic gap of the magnetic assemblies 231, 232, 233 and the heat transfer fluid is moved from the hot end H21 of the magnetocaloric material 213 with the highest Curie temperature of the thermal module 210 to the cold end C21 of the magnetocaloric material 211 with the lowest Curie temperature. This alternation of fluid directions permits to obtain and to keep a temperature gradient in the thermal module 210.

According to the invention, the fact of dividing thermally the magnetic assemblies 231, 232, 233 and of assigning one or more magnetocaloric materials able to operate over a limited range of temperatures has two main advantages. On one hand, at the start of the thermal generator, the magnetocaloric materials 211, 212, 213 keep their temperature between two magnetic phases and the global temperature gradient in the thermal module 210 is achieved more rapidly. The thermal insulation permits to take advantage of the thermal inertia of the magnetocaloric materials 211, 212, 213. On the other hand, the performance of the thermal generator 200 is enhanced because the temperature gradient undergone by each pair of magnets 231, 232, 233 is limited and thus the magnets have less thermal influence on the temperature gradient of the corresponding magnetocaloric material 211, 212, 213 and no energy is used in order to re-obtain the maximal temperature gradient in said magnetocaloric material. The thermal insulation also permits to take advantage of the thermal inertia of the magnetic assemblies 231, 232, 233.

Moreover, it is possible to realize the insulated cells 241, 242, 243 as tight enclosures and to put them under vacuum or to fill them with a gas of low thermal conductivity like argon or krypton, for example, or with mix of these gases. Preferably, this gas is at atmospheric pressure. It can also be pressurized. Stuffing box sealing systems can be used to guaranty the tightness of the enclosures while allowing connections (electrical, mechanical, etc.) with the outside of the enclosures.

Insulated cells according to the invention are particularly feasible in the disclosed configurations because the flow direction of the fluid in the magnetocaloric elements is perpendicular to the direction of the magnetic field variation.

The same advantages as those previously described in connection with the first embodiment also apply to this second embodiment.

Figure 5B:
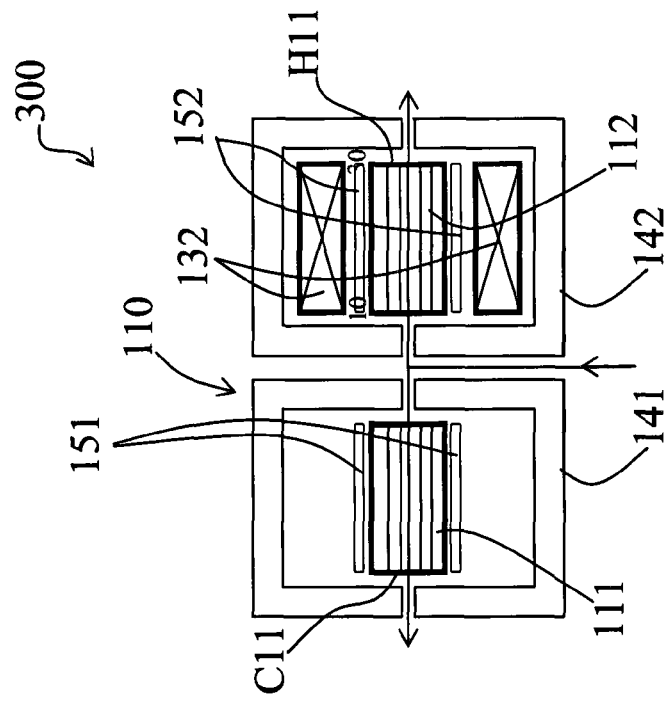
Figure 5A:
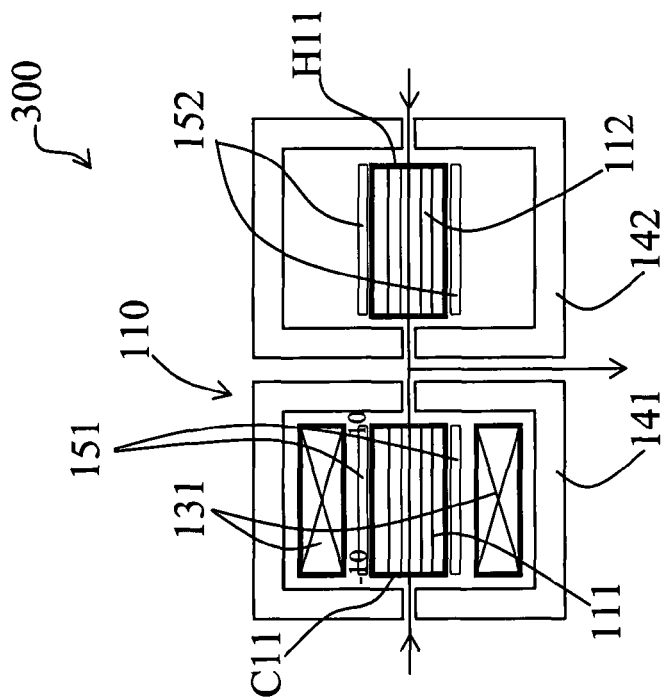

FIGS. 5A and 5B show a thermal generator 300 according to an alternative embodiment of the generator 100 of FIGS. 2A and 2B. It proposes to interpose a thermal insulating material 151, 152 between the magnetic assemblies 131, 132 and their corresponding magnetocaloric elements 111, 112. In FIGS. 5A and 5B, this insulating material 151, 152 is a layer of foam placed onto the magnetocaloric elements 111, 112. The insulating material can also be an aerogel type material. However, the invention is not linked with this type of configuration, the foam can also be applied onto the magnetic assemblies 131, 132 for example. This preferred configuration permits to reduce even more the thermal effect of the magnetic assemblies on the magnetocaloric elements 111, 112.

POSSIBLE INDUSTRIAL APPLICATIONS

This thermal generator 100, 200, 300 finds its application in any technical field where it is necessary to heat, temper, cool or air-condition.

The present invention is not restricted to the examples of embodiment described, but extends to any modification or variant which is obvious to a person skilled in the art while remaining within the scope of the protection defined in the attached claims.

The invention claimed is:

1. A thermal generator having
a heat transfer fluid which flows through the thermal generator,
at least a first thermal module comprising at least a first magnetocaloric element and a second magnetocaloric element,
wherein the first magnetocaloric element has a first fluid passage and the second magnetocaloric element has a second fluid passage,
wherein the first magnetocaloric element and the second magnetocaloric element are fluidly connected by the heat transfer fluid flowing through the first and second fluid passages,
wherein the thermal generator comprises at least a first magnetic assembly and a second magnetic assembly, in which the first magnetic assembly subjects at least the first magnetocaloric element of said thermal module to alternating magnetic phases, and
the thermal generator comprises a thermally insulating body insulating the first magnetic assembly and second magnetic assembly from each other, the thermally insulating body forming a first thermally insulated cell and a second thermally insulated cell, the first thermally insulated cell comprising the first magnetic assembly and at least the first magnetocaloric element,
the second thermally insulated cell comprising the second magnetic assembly and at least the second magnetocaloric element.

2. The thermal generator, according to claim 1, wherein for said at least one thermal module, one magnetic assembly is assigned to one magnetocaloric element.

3. The thermal generator of claim 1, wherein the thermal generator comprises a second thermal module, the second thermal module having at least a third magnetocaloric element and a fourth magnetocaloric element,
wherein the third magnetocaloric element has a third fluid passage and the fourth magnetocaloric element has a fourth fluid passage,
the third magnetocaloric element being arranged in the first thermally insulated cell,
wherein the first magnetic assembly subjects both the first magnetocaloric element of the first thermal module and the third magnetocaloric element of the second thermal module to alternating magnetic phases.

4. The thermal generator according to claim 1, wherein the insulating body is realized by a layer of at least one thermal insulating material disposed around each magnetic assembly and the at least one magnetocaloric element which the magnetic assembly subjects to a magnetic field.

5. The thermal generator according to claim 1, wherein the insulating body is fixed to the magnetic assemblies.

6. The thermal generator according to claim 1, wherein a layer of thermal insulating material is disposed between each magnetic assembly (131, 132) and the at least one magnetocaloric element which the magnetic assembly subjects to a magnetic field.

7. The thermal generator according to claim 1, wherein motion of the at least two magnetic assemblies with respect to the at least one magnetocaloric element of subjects the at least one magnetocaloric element to alternating magnetic phases.

8. The thermal generator according to claim 1, wherein an operating temperature for at least one of the at least two magnetocaloric elements is at or above negative ten degrees Celsius (−10° C.).

9. The thermal generator according to claim 1, wherein a operating temperature for each of the at least two magnetocaloric elements is at or above negative ten degrees Celsius (−10° C.).

10. The thermal generator according to claim 1, wherein a heat transfer fluid flows through the at least one thermal module in alternating and opposite directions, in sync with the alternating magnetic phases.

11. The thermal generator according to claim 1, wherein said thermally insulated cells are air tight enclosures.

12. The thermal generator according to claim 11, wherein said thermally insulated cells are under vacuum.

13. The thermal generator according to claim 11, wherein said insulated cells are filled with a gas or a mix of different gasses, the gas or mix of different gasses having a low thermal conductivity.

14. The thermal generator according to claim 13, wherein said gas or mix of different gasses contained in said insulated cells is at atmospheric pressure.

15. The thermal generator according to claim 13, wherein said gas or mix of different gasses contained in said insulated cells is pressurized.

* * * * *